United States Patent [19]
Donahue

[11] Patent Number: 6,120,001
[45] Date of Patent: Sep. 19, 2000

[54] APPARATUS FOR REGULATING FLUID FLOW THROUGH A FLEXIBLE CONDUIT

[75] Inventor: Lawrence J. Donahue, Rancho Palos Verdes, Calif.

[73] Assignee: Northrop Grumman Corporation, Los Angeles, Calif.

[21] Appl. No.: 09/225,386

[22] Filed: Dec. 31, 1998

Related U.S. Application Data

[63] Continuation-in-part of application No. 08/760,908, Dec. 6, 1996, abandoned.

[51] Int. Cl.[7] ........................................................ F16K 7/04
[52] U.S. Cl. .................................... 251/4; 251/5; 137/486
[58] Field of Search ........................ 251/4, 5, 7; 137/486

[56] References Cited

U.S. PATENT DOCUMENTS

| | | | |
|---|---|---|---|
| 2,619,386 | 11/1952 | Dalrymple | 251/7 |
| 3,018,793 | 1/1962 | Aagaard | 251/5 |
| 3,322,147 | 5/1967 | Barrows | 251/5 |
| 3,823,724 | 7/1974 | Davis | 137/15 |
| 4,372,304 | 2/1983 | Avakian et al. | 128/214 |
| 5,113,906 | 5/1992 | Hogner | 137/595 |
| 5,152,309 | 10/1992 | Twerdochlib et al. | 137/487.5 |

FOREIGN PATENT DOCUMENTS

| | | | |
|---|---|---|---|
| 193419 | of 0000 | Switzerland | 251/5 |
| 677115 | 8/1952 | United Kingdom | 251/7 |

*Primary Examiner*—Gregory L. Huson
*Assistant Examiner*—Ramesh Krishnamurthy
*Attorney, Agent, or Firm*—Terry J. Anderson; Karl J. Hoch, Jr.

[57] ABSTRACT

A fluid regulator including compression member adapted to engage a fluid conduit, a biasing element operably connected to the compression member and producing a sufficient amount of biasing force to cause the compression member to deform the conduit to a substantially closed state, and a control device for applying a control force to the compression member. The control force may partially overcome the biasing force applied to the compression member and maintain the compression member such that the fluid conduit is maintained in a partially open state.

24 Claims, 3 Drawing Sheets

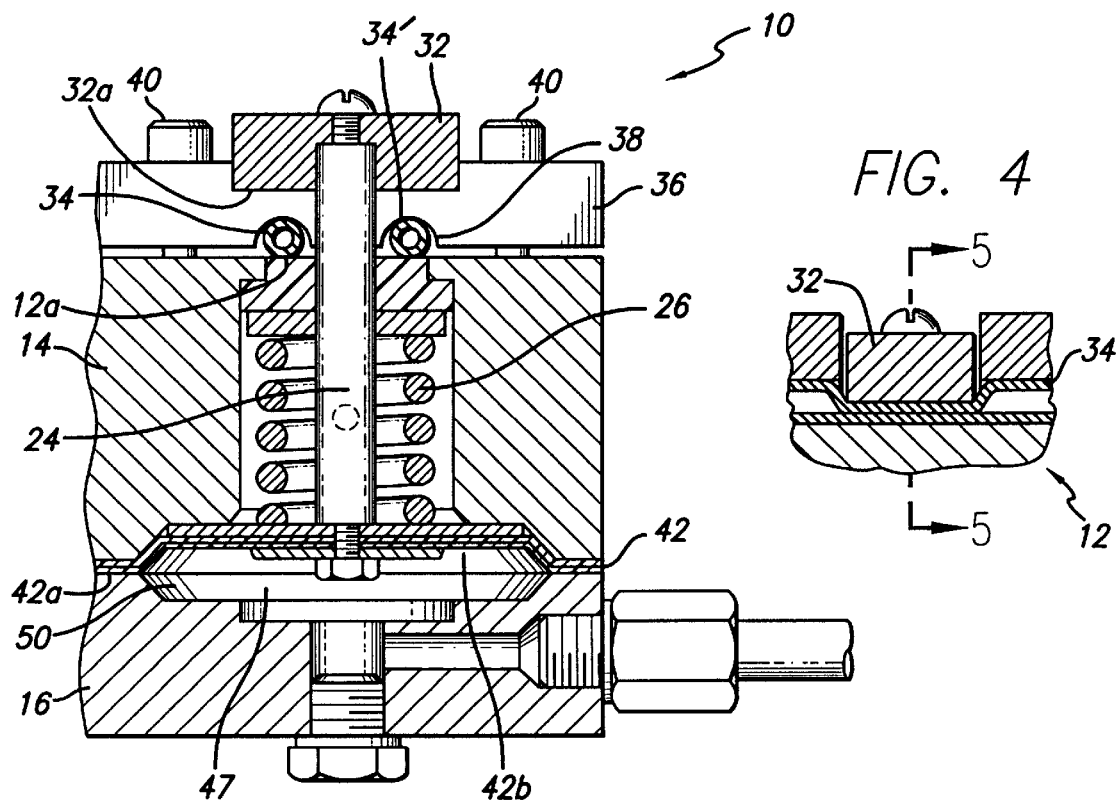
FIG. 3
FIG. 4
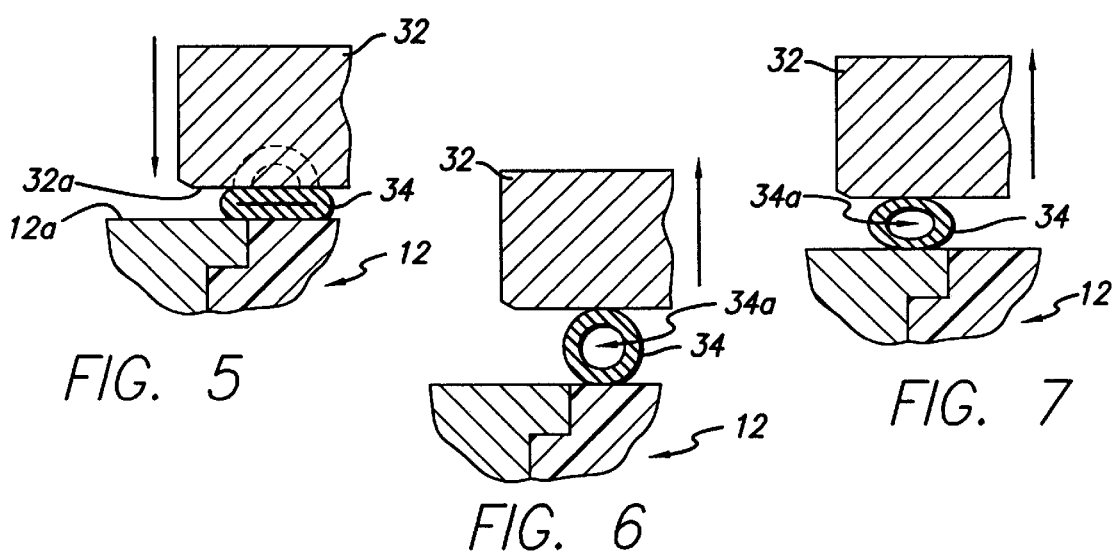
FIG. 5
FIG. 6
FIG. 7

APPARATUS FOR REGULATING FLUID FLOW THROUGH A FLEXIBLE CONDUIT

REFERENCE TO RELATED APPLICATION

This application is a continuation-in-part of U.S. application Ser. No. 08/760,908, filed Dec. 6, 1996, now abandoned.

BACKGROUND OF THE INVENTION

1. Field of Invention

This invention relates generally to an apparatus for controlling the flow of fluids and, more particularly, to a regulator for precisely controlling the flow rate of various fluids, such as fluid having high solid content through a flexible conduit.

2. Description of the Related Art

Fluid regulators regulate the flow of both liquids and gasses and are used for a variety of purposes in a variety of industries. Certain fluid regulators regulate the flow of fluid through a flexible conduit by mechanically deforming the conduit so that the passage therethrough is completely closed. These regulators are often referred to as "pinch-type" regulators because they include a mechanism which pinches the flexible conduit. Such regulators can be generally separated into two classes. Regulators in the first class include a relatively short length of flexible conduit. Each end of the conduit includes threaded end portions, one serving as an inlet and one serving as an outlet. This allows the regulator to be spliced into an existing system. Regulators in the second class are designed to be secured, or clamped, onto a portion of a flexible conduit that is already part of the system to be regulated. As a result, pinch-type regulators in the second class are significantly easier to install than those in the first class.

One disadvantage associated with both classes of pinch-type fluid regulators is that they are designed to be either in an ON position, where the conduit is not substantially deformed, or an OFF position, where the passage through the conduit is completely closed. They cannot be maintained in positions therebetween. Thus, prior pinch-type fluid regulators are incapable of precisely controlling the size of the conduit passage to precisely vary (or meter) the flow of fluid therethrough.

As for pinch-type fluid regulators in the second class, i.e. those which are clamped onto a flexible conduit that is part of an existing system, one disadvantage associated with prior regulators is that they tend to severely deform the flexible conduit. Such severe deformation causes the conduit to deteriorate rapidly and also necessitates the use of conduit having a relatively high degree of flexibility. Highly flexible conduit is, however, susceptible to the corrosive effects of strong chemicals such as paints, solvents and acids. As a result, it has been heretofore undesirable to employ fluid regulators that are clamped onto a flexible conduit in a system involving corrosive chemicals.

Yet another short coming with the pinch-type fluid regulators is that flow rate of fluids having high solid content, such as paint, can not be precisely metered. As a matter of background, fluids without high solid content are considered Newtonian fluids, i.e. fluids with a constant viscosity; while fluids with high solid content, such as paint, are considered thixotropic because the viscosity of the fluid drops as the flow rate of the fluid increases. Also, fluids having lower viscosity flow more easily than fluids having higher viscosity.

As a result, when the conduit is initially opened to allow the paint to flow, the initial flow of the paint is substantially inhibited because of its initial high viscosity. However, as the paint starts to flow, the viscosity of the paint decreases, which further accelerates the flow of paint. By analogy, this can be seen as trying to pore ketchup out of a ketchup bottle, as the bottle is tilted, the ketchup initially does not flow, however, once the ketchup starts flowing, the ketchup all of sudden gushes out. Consequently, to precisely meter the flow of paint, the initial opening of the conduit needs to be larger, to compensate for initial slow flow rate of the paint. However, as the flow rate of the paint substantially accelerates, the conduit opening needs to be reduced so that consistent flow rate is maintained. Therefore, a pinch-type regulator, which simply opens and closes the conduit, is inadequate to precisely control the flow rate of the paint through the conduit.

OBJECT AND SUMMARY OF THE INVENTION

A general object of the present invention is to provide a fluid regulator that is superior to those presently known in the art. In particular, one object of the present invention is to provide a pinch-type fluid regulator that is capable of precisely reducing the conduit passage to precisely meter the flow of fluid, including fluids having high solid content such as paint, therethrough. Another object of the present invention is to provide a pinch-type fluid regulator that will not severely deform the flexible conduit used therewith.

In accordance with one aspect of the present invention, these and other objectives are accomplished by providing a compression member adapted to engage a fluid conduit, a biasing element operably connected to the compression member and producing a sufficient amount of biasing force to cause the compression member to deform the conduit to a substantially closed state, and a control device for applying a control force to the compression member which will partially overcome the biasing force applied to the compression member and maintain the compression member such that the fluid conduit is maintained in a partially open state. As the present apparatus is capable of maintaining the flexible conduit in a partially open state, it is capable of providing more precise regulation than that presently known in the art.

In accordance with another aspect of the present invention, these objectives are accomplished by providing a fluid control apparatus including a guide adapted to maintain a first side of a fluid conduit on a substantially flat surface, a compression member defining a substantially flat compression surface adapted to engage the second side of the fluid conduit, a biasing element operably connected to the compression member and producing a sufficient amount of biasing force to cause the compression member to deform the conduit to a substantially closed state, and a control device for applying a control force to the compression member which will partially overcome the biasing force applied to the compression member and maintain the compression member such that the fluid conduit is maintained in a partially open state. The flat surfaces prevent the conduit from being radically deformed. As a result, the wear on the conduit is reduced and semi-rigid conduit, such as that used in conjunction with strong chemicals, may be used.

Yet another aspect of the invention is to provide a compression member that concurrently engages with a plurality or two, fluid conduits, that are evenly distributed to provide a balanced load on the compression member, thereby avoiding possible jamming or malfunction of the regulator.

Many other features and attendant advantages of the present invention will become apparent as the invention becomes better understood by reference to the following detailed description considered in conjunction with the accompanying drawings.

BRIEF DESCRIPTION OF THE DRAWINGS

Detailed description of the preferred embodiment of the invention will be made with reference to the accompanying drawings.

FIG. 3 is a section view showing the apparatus in the fully open position.

FIG. 4 is a partial section view showing the compression member compressing a conduit.

FIG. 5 is a section view taken along line 5—5 in FIG. 4 showing a conduit in a fully closed state.

FIG. 6 is a section view showing a conduit in a fully open state.

FIG. 7 is a section view showing a conduit in a partially open state.

DETAILED DESCRIPTION OF THE PREFERRED EMBODIMENT

The following is a detailed description of the best presently known mode of carrying out the invention. This description is not to be taken in a limiting sense, but is made merely for the purpose of illustrating the general principles of the invention. The scope of the invention is defined solely by the appended claims.

Figure 1:
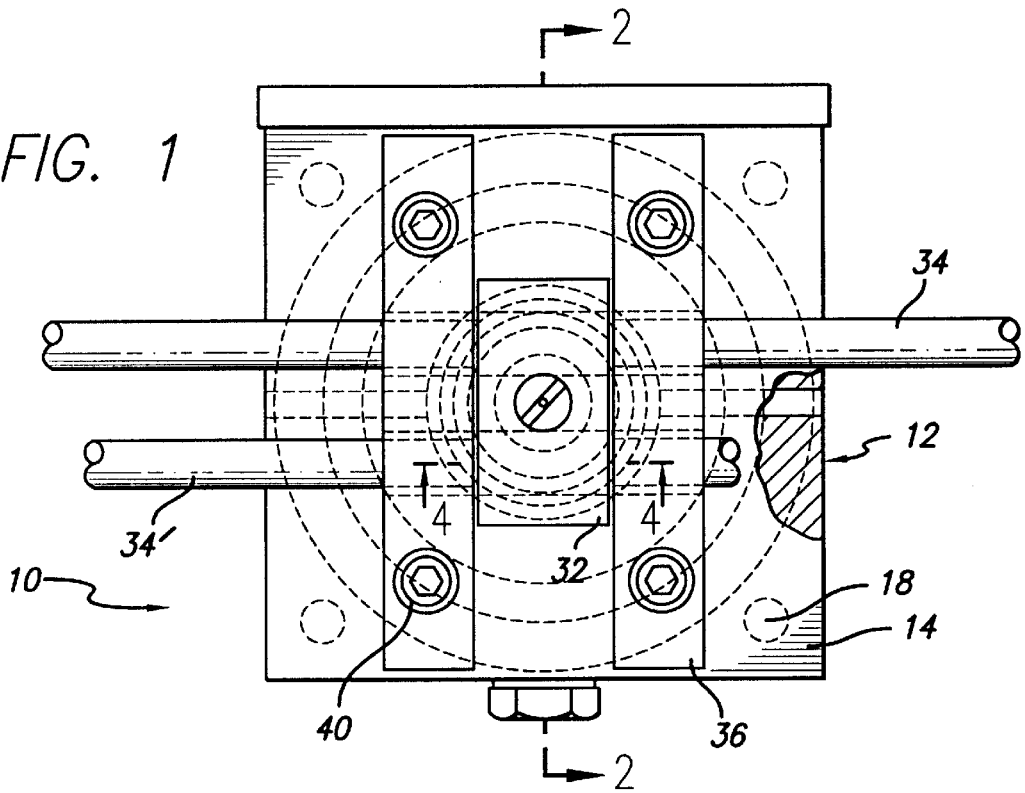
FIG. 1 is a top view of an apparatus for regulating the flow of fluid in accordance with a preferred embodiment of the present invention.
Figure 2:
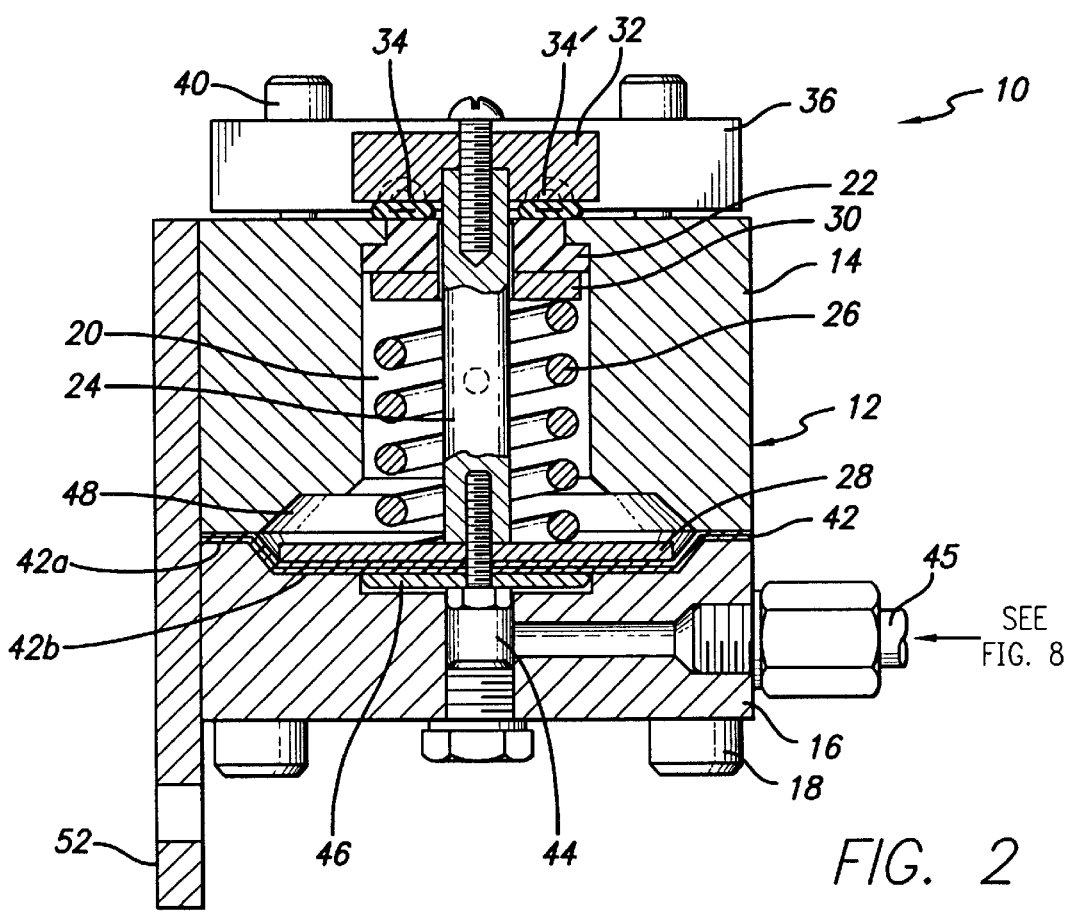
FIG. 2 is a section view taken along line 2—2 in FIG. 1 showing the apparatus in the fully closed position.

As illustrated for example in FIGS. 1–3, a fluid regulator 10 in accordance with a preferred embodiment of the present invention includes a housing 12 which may consist of a top housing member 14 and a bottom housing member 16. The housing members 14 and 16 are secured to one another by a series of bolts 18 (or other mechanical fasteners). The top housing member 14 includes a relatively narrow, elongate passage 20 which is covered by a cap 22. A plunger 24 extends through the passage 20 and cap 22. In the exemplary embodiment, the plunger 24 is downwardly biased (in the orientation shown) by a compression spring 26 which rests on a plate 28 located at one end of the plunger 24. A spacer 30 may be placed between the spring 26 and the cap 22. The amount of bias created by a particular spring may be varied by varying the size of the spacer 30.

In the exemplary embodiment, the other end of the plunger 24 extends outwardly of the housing 12 and includes a compression member 32. The compression member may be either integral with the plunger or attached thereto. The compression member 32 is used to restrict the flow of fluid (either gas or liquid) through one or more flexible conduits 34. The conduits may be secured to the exterior of the housing 12 by a pair of guides (or clamps) 36. The guides, which include grooves 38, are secured to the exterior of the housing 12 by a series of bolts 40 (or other mechanical fasteners). Absent any counteracting forces, the biasing force applied to the plunger 24 by the spring 26 will cause the compression member 32 to deform the conduits 34 in the manner shown in FIGS. 2, 4 and 5. No fluid will flow past compression member 32 when the conduits are compressed in this manner.

In order to overcome the biasing force exerted by spring 26 and allow fluid flow, the preferred embodiment of the present invention also includes a pneumatic actuator which applies a force to the plunger 24 opposite that exerted by the spring. More specifically, the exemplary embodiment includes a flexible diaphragm 42 that will deflect between the orientation shown in FIG. 2 and that shown in FIG. 3 in response to the input of pressurized fluid through a fluid inlet aperture 44 by way of a line 45. The pressurized fluid may be either gas or liquid, with air being the preferred gas, and water being the preferred liquid. Where further precision is required to deflect the diaphragm 42, liquid may be preferred because liquid is relatively incompressible, thus more precisely deflecting the diaphragm.

The diaphragm 42 includes an outer portion 42a which is sandwiched between the top and bottom housing elements (14 and 16) so as to provide both a gas-tight and liquid-tight seal and hold the diaphragm in place. The inner portion 42b of the diaphragm 42 is located between the plate 28 and a plate 46 and all three of these elements are secured to the end of the plunger 24. A pair of depressions 48 and 50, which enable to diaphragm to move within the housing, are formed in the top housing element 14 and bottom housing element 16, respectively. The area between the bottom housing member 16 and the diaphragm 42 defines a fluid storage area 47, as shown in FIG. 3, for example.

The flow rate through conduits 34 may be precisely controlled by controlling the pressure of the fluid pumped (discussed more fully below) into the fluid storage area 47 through the fluid inlet aperture 44 and by maintaining a particular pressure for the requisite period of time. The pressure of the fluid may be such that the biasing force of the spring 26 will be either partially or completely overcome by the force exerted on the plunger 24 by the diaphragm 42. As a result, conduits 34 may be maintained in the fully closed state shown in FIG. 5, the fully open state shown in FIG. 6, and any state in between (such as that shown in FIG. 7) for as long as the operator desires. The size of conduit opening 34a may be varied while fluid flows through the conduit or before flow begins.

Figure 8:
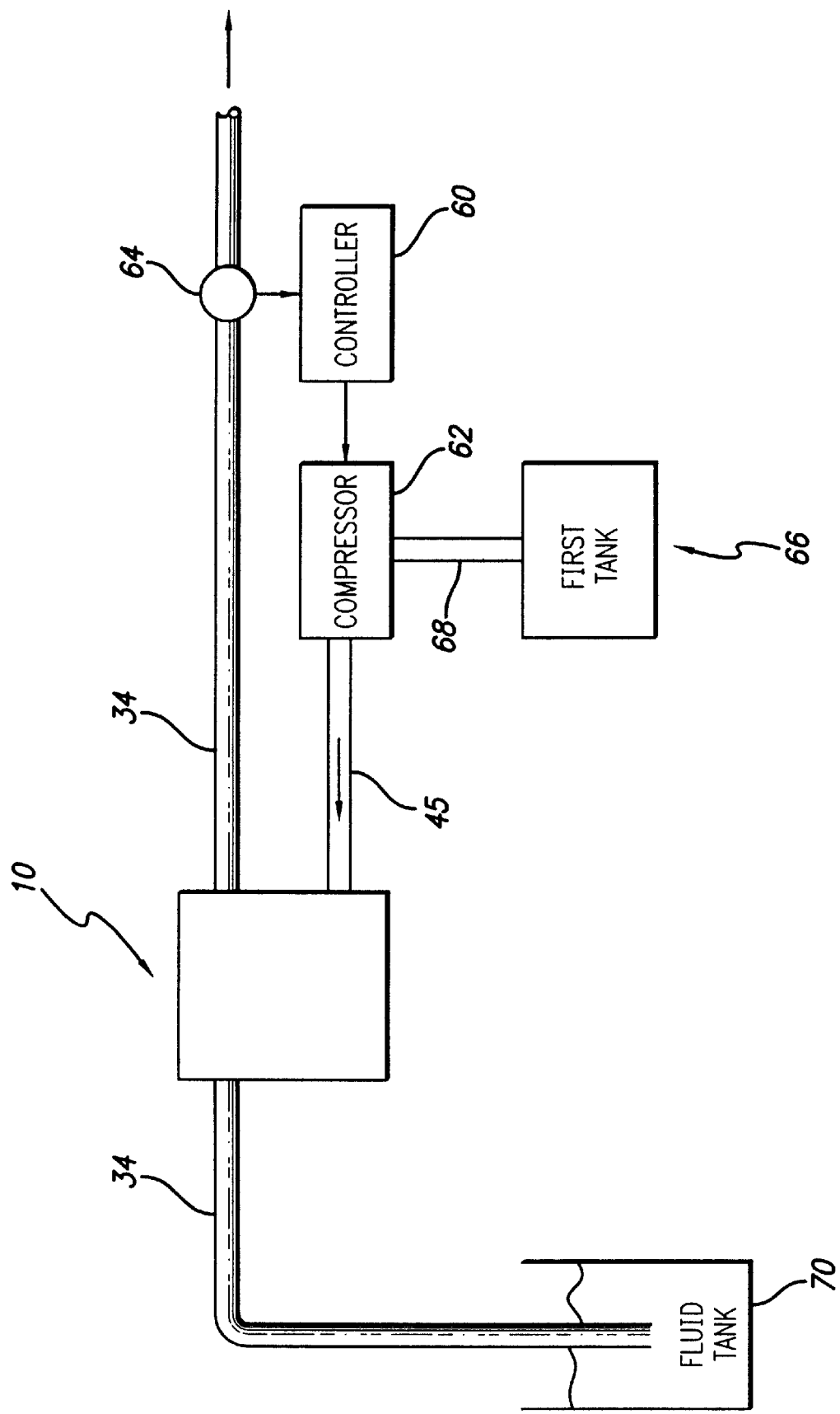
FIG. 8 is a block diagram showing a controller monitoring the operation of the apparatus.

As illustrated by way of example in FIG. 8, precise control of the fluid pressure within the fluid storage area 47 (see FIG. 3) may be accomplished through the use of a controller 60 which is communicably coupled to a compressor 62 to adjust the flow of the fluid supplied to the fluid storage area 47. In this regard, the compressor 62 may draw fluid from a first tank 66 through a line 68, then supply the fluid to the fluid storage area 47 so that precise pressure is provided within the fluid storage area 47 through the line 45. As discussed earlier, the fluid supplied from the first tank 66 may be either gas or liquid depending on the application, with air being the preferred gas and water being the preferred liquid. When further precision is required to deflect the diaphragm 42, liquid may be preferred because liquid is relatively incompressible, thus deflecting the diaphragm 42 more precisely.

Precision is still further improved with a flow meter 64 providing feed back information to the controller 60. The flow meter 64 is preferably coupled to the conduit 34 positioned downstream from the fluid control apparatus 10. Here, the controller 34 continuously monitors the flow rate of the fluid through the conduit 34, via the flow meter 64. The controller 60 is preferably a microprocessor-based, which compares the fed back information with the desired flow rate value. If deviations from the desired flow rate value is found, the controller 60 then makes necessary adjustments to the compressor 62 so that the pressure from the fluid supplied by the compressor 62 is adjusted to correct the deviation. An adjustment from a given flow rate to a newly desired flow rate will normally take place in less than one second using a conventional microprocessor-based controller. Preferably, the controller 60 will continuously monitor the flow rate of fluid through the conduit 34 and make necessary adjustments to precisely control the opening of the conduit 34a, thereby precisely controlling the flow rate of the fluid through the conduit 34. As a result, the present system may be used to provide a very small opening in the conduit, thereby precisely controlling even low flow rates.

With the present invention, even fluid having high solid content, such as paint, is precisely metered. To precisely meter the flow of paint, the initial opening of the conduit needs to be larger, to compensate for initial slow flow rate of the paint. However, as the paint starts to flow, the conduit opening needs to be reduced, because the flow of paint substantial accelerates due to decrease in viscosity. Accordingly, to precisely control the flow rate of the paint, the controller 60 continuously monitors the flow rate of the paint through the conduit 34 and make necessary adjustments to the pressure within the fluid storage area 47, to precisely control the flow rate of the paint through the conduit 34. Also, if the desired flow rate is later changed, the controller 60 will make necessary adjustments as discussed above to precisely control the flow rate of the fluid through the conduit 34.

It should be noted that the compressor 62 may be tied into the controls for the overall system with which the present fluid control apparatus is employed, such as a painting system, or controlled separately. Alternatively, the controller 60 may be programmed remotely, i.e. wirelessly, to change any of the settings, such as desired flow rate of the fluid.

As illustrated for example in FIGS. 4–7, the size of the conduit openings 34a is reduced as necessary by compressing the conduit between the generally flat outer surface 12a of the housing 12 and the generally flat bottom surface 32a of the compression member 32. Even when the conduit is compressed into the fully closed state shown in FIG. 5, the centerline of the conduit is still within the perimeter defined by the conduit when it is in the fully open state shown in FIG. 6. Also, as shown in FIGS. 2 and 4, the compression surface 32a is relatively is relatively wide (measured in the longitudinal direction of the conduit). The width is at least as great as any cross-sectional dimension of the conduit taken perpendicular to the conduit's length. Thus, when the conduit is flattened, there are no sharp corners where the conduit is bent inwardly and then outwardly, as would be the case if the compression surface was relatively short.

As the conduit will not be radically deformed by the present invention, which was the case in prior apparatus, stress related deterioration of the conduit will be reduced and the life of the conduit increased. In addition, because of the relatively low level of deformation, the present fluid control apparatus is especially useful with conduits formed from semi-rigid materials such as perfluoroalkoxy, which is sold under the trade name TEFLON™, and other similar fluoropolymers. These materials are highly resistant to the deteriorating effects of strong chemicals, such as paint. Thus, the present invention is especially useful in chemical applications when it is desirable to clamp a regulator onto a conduit without splicing the regulator into the system.

As illustrated by way of example in FIGS. 1–3, the present system provides smooth and evenly progressing compression to the conduit 34, to further ensure that the flow rate of fluid through the conduit 34 is precisely metered. In this regard, balanced actuation is accomplished by incorporating a conduit 34' on the opposite side of the plunger 24. Accordingly, as the compression member 32 clamps down, the load is evenly distributed between the conduits 34 and 34'. Also, based on the particular operation, the conduit 34' may be operational, i.e., if two lines of fluids are needed, then fluid may flow from both conduits 34 and 34'. On the other hand, if only one line of fluid is needed, then only one of the conduits may be operational, i.e. either conduit 34 or 34'. As a further alternative, the non-operational line may serve as a spare, in case the operational conduit breaks down or is in need of maintenance. Preferably, the non-operational conduit is filled with similar fluid as the operational conduit so that substantially similar resistance is provided to the compression member 32. FIG. 8, shows an exemplary fluid tank 70 for supplying various fluids, such as paint or gas, to the fluid regulator 10, via conduit 34.

It should be noted, however, that the conduits 34 and 34' may carry different fluids, such as different types of paint. Still further, one conduit may carry liquid, while other conduit carries gas. Also, a plurality of conduits may be regulated by the present invention, rather than just the two conduits 34 and 34' as shown in FIGS. 1–3. In this instance, the plurality of conduits are preferably evenly distributed between the plunger 32, to provide balance compression. Alternatively, the compression member 32 and the plunger 24 may be designed to provide a balance load to one conduit.

With respect to materials, the housing 12 is preferably formed from aluminum and/or steel. The diaphragm 42 is preferably formed from neoprene, TEFLON™, or any other material that possesses suitable flexibly and strength. The materials need not necessarily be of the type that resist the corrosive effects of strong chemicals because the chemicals passing through the conduits will not come into contact with the interior of the housing. Additionally, as shown in FIGS. 2 and 3, the diaphragm may be a multi-part assembly consisting of a number of diaphragm members. The primary benefit of the multi-part assembly is that it provides a combination of flexibility and strength that is difficult to achieve with a single-part diaphragm. Single part diaphragms that are thick enough to exhibit the requisite strength are often too stiff.

Mounting the present fluid regulator 10 in an existing device can be accomplished through the use of a mounting plate 52. The regulator may be mounted in the orientation shown in FIG. 2, or rotated up to 180° from the illustrated orientation.

Although the present invention has been described in terms of the preferred embodiment above, numerous modifications and/or additions to the above-described preferred embodiments would be readily apparent to one skilled in the art.

By way of example, but not limitation, the plunger may be biased by a leaf spring or other means known to those of skill in the art. The clamp may also be modified so as to be spring based, instead of bolt or fastener based. With respect to the manner in which the biasing force applied to the plunger is overcome, liquid may be used in place of gas to displace the diaphragm. Also, the entire diaphragm arrangement may be replaced by an electromechanical device, such as a solenoid, which overcomes the biasing force.

It is intended that the scope of the present invention extends to all such modifications and/or additions and that the scope of the present invention is limited solely by the claims set forth below. With respect to the claims, it is applicant's intention that the claims not be interpreted in accordance with the sixth paragraph of 35 U.S.C. §112 unless the term "means" is used followed by a functional statement.

What is claimed is:

1. A regulator for regulating the flow of paint through a fluid conduit that is deformable between a substantially open state and a substantially closed state, the fluid flow regulator comprising:

a housing defining an interior having a first interior surface and a second interior surface, an exterior surface, an aperture located substantially adjacent to a predetermined portion of the exterior surface, and a gas inlet;

a guide adapted to maintain the fluid conduit on the predetermined portion of the housing exterior surface;

a plunger defining a first longitudinal portion extending through the housing aperture and a second longitudinal portion located within the housing interior;

a compression member associated with the first longitudinal portion of the plunger and extending outwardly therefrom over the predetermined portion of the housing exterior surface such that a portion of the fluid conduit is located between the compression member and the predetermined portion of the housing exterior surface, the compression member being movable between a first position wherein the fluid conduit is in the substantially open state and a second position wherein the fluid conduit is in the substantially closed state;

a resilient member located within the housing interior and adapted to apply a biasing force to the plunger such that the compression member is biased toward the predetermined portion of the housing exterior surface, the resilient member producing a sufficient amount of biasing force to cause the compression member to deform the fluid conduit to the substantially closed state;

a diaphragm, defining a first outer surface and a second outer surface, located within the housing interior, operably connected to the plunger, and dividing the housing interior into a first interior portion defined by the first outer surface of the diaphragm and the first interior surface of the housing and a second interior portion defined by the second outer surface of the diaphragm and the second interior surface of the housing, the resilient member being located within the first interior portion and the gas inlet being associated with the second interior portion; and a compressor coupled to the gas inlet for supplying gas to provide a predetermined pressure within the second interior portion of the housing;

a controller communicably coupled to the compressor; and a flow meter communicably coupled to the controller and coupled to the fluid conduit to measure the flow rate of paint through the fluid conduit, wherein the controller continuously monitors the flow rate of paint through the fluid conduit via the flow meter and communicates with the compressor to adjust the predetermined pressure within the second interior portion of the housing to cause the diaphragm to partially overcome the biasing force of the biasing element thereby causing the position of the compression member to vary between the first and second positions thereby partially opening the fluid conduit between the substantially open state and the substantially closed state such that the flow rate of paint through the fluid conduit is precisely metered.

2. A regulator as claimed in claim 1, wherein the predetermined portion of the housing exterior surface is substantially flat and a surface of the compression member in contact with the fluid conduit is substantially flat.

3. A regulator as claimed in claim 1, wherein the resilient member comprises a spring.

4. An apparatus for regulating the flow of first fluid through a fluid conduit that is deformable between a substantially open state and a substantially closed state, the apparatus comprising:

a housing defining an interior having a surface;

a compression member associated with the housing and adapted to engage the fluid conduit, the compression member being movable between a first position wherein the fluid conduit is in the substantially open state and a second position wherein the fluid conduit is in the substantially closed state;

a biasing element operably coupled to the compression member and producing a sufficient amount of biasing force to cause the compression member to deform the fluid conduit to the substantially closed state;

a substantially flat diaphragm operably coupled to the biasing element to partially overcome the biasing force, the substantially flat diaphragm defining an outer perimeter, associated with the housing interior such that a fluid storage area is defined by the diaphragm and housing interior surface where second fluid will directly contact the housing interior surface and the diaphragm, the entire outer perimeter of the diaphragm being secured to the housing;

a compressor coupled to the fluid storage area to provide a predetermined pressure to the fluid storage area;

a controller communicably coupled to the compressor; and a flow meter communicably coupled to the controller and coupled to the fluid conduit to measure the flow rate of the first fluid flowing through the fluid conduit, wherein the controller continuously monitors the flow rate of the first fluid through the fluid conduit via the flow meter and communicates with the compressor to adjust the predetermined pressure within the fluid storage area to cause the diaphragm to partially overcome the biasing force of the biasing element thereby causing the position of the compression member to vary between the first and second positions thereby partially opening the fluid conduit between the substantially open state and the substantially closed state such that the flow of first fluid through the fluid conduit is precisely metered through the fluid conduit.

5. An apparatus as claimed in claim 4, further comprising:

a guide adapted to maintain the fluid conduit at a predetermined location with respect to the housing.

6. An apparatus as claimed in claim 5, wherein the housing defines an exterior and the guide maintains the fluid conduit adjacent to a predetermined portion of the housing exterior.

7. An apparatus as claimed in claim 5, wherein the guide comprises a pair of guide members and the compression member is located substantially between the guide members.

8. An apparatus as claimed in claim 4, further comprising:

a substantially rigid member operably connected to the compression member and the biasing element.

9. An apparatus as claimed in claim 4, wherein the biasing element is a spring.

10. An apparatus as claimed in claim 4, wherein the compression member defines a substantially flat surface adapted to engage the fluid conduit.

11. An apparatus as claimed in claim 4, further comprising:
   a spare fluid conduit; and
   the compression member associated with the housing and adapted to engage the fluid conduit and the spare fluid conduit.

12. An apparatus as claimed in claim 11, wherein the fluid conduit and the spare fluid conduit are each maintained at a predetermined location with respect to the housing to provide a balanced load on the compression member.

13. An apparatus as claimed in claim 4, wherein the housing comprises first and second housing members and a predetermined portion of the diaphragm is secured between the first and second housing members.

14. An apparatus as claimed in claim 4, wherein the second fluid supply device supplies gas to the fluid storage area.

15. An apparatus as claimed in claim 4, wherein the second fluid supply device supplies liquid to the fluid storage area.

16. An apparatus as claimed in claim 4, wherein the first fluid has solid content.

17. An apparatus as claimed in claim 4, wherein the first fluid is paint.

18. An apparatus as claimed in claim 4, wherein the substantially flat diaphragm is a multi-part diaphragm assembly, said multi-part diaphragm including a first layer and second layer.

19. An apparatus for regulating flow of paint having a substantial solid content, the apparatus comprising:
   a semi-rigid conduit that is continuously deformable between a substantially open state and a substantially closed state;
   a source of paint supplied to the semi-rigid conduit;
   a housing defining an interior having a first interior surface and a second interior surface, an exterior surface, an aperture located substantially adjacent to a predetermined portion of the exterior surface, and a second fluid inlet;
   a guide adapted to maintain the semi-rigid conduit on the predetermined portion of the housing exterior surface;
   a plunger defining a first longitudinal portion extending through the housing aperture and a second longitudinal portion located within the housing interior;
   a compression member associated with the first longitudinal portion of the plunger and extending outwardly therefrom over the predetermined portion of the housing exterior surface such that a portion of the semi-rigid conduit is located between the compression member and the predetermined portion of the housing exterior surface, the compression member being movable between a first position wherein the conduit is in the substantially open state and a second position wherein the conduit is in the substantially closed state;
   a resilient member located within the housing interior and adapted to apply a biasing force to the plunger such that the compression member is biased toward the predetermined portion of the housing exterior surface, the resilient member producing a sufficient amount of biasing force to cause the compression member to deform the semi-rigid conduit to the substantially closed state;
   a diaphragm, defining a first outer surface and a second outer surface, located within the housing interior, operably connected to the plunger, and dividing the housing interior into a first interior portion defined by the first outer surface of the diaphragm and the first interior surface of the housing and a second interior portion defined by the second outer surface of the diaphragm and the second interior surface of the housing, the resilient member being located within the first interior portion and the gas inlet being associated with the second interior portion; and
   a compressor coupled to the second fluid inlet for supplying second fluid to provide a predetermined pressure within the second interior portion of the housing;
   a controller communicably coupled to the compressor; and
   a flow meter communicably coupled to the controller and coupled to the semi-rigid conduit to measure the flow rate of paint through the semi-rigid conduit, wherein the controller continuously monitors the flow rate of paint through the semi-rigid conduit via the flow meter and communicates with the compressor to adjust the predetermined pressure within the second interior portion of the housing to cause the diaphragm to partially overcome the biasing force of the biasing clement thereby causing the position of the compression member to vary between the first and second positions thereby partially opening the semi-rigid conduit between the substantially open state and the substantially closed state such that the flow rate of paint through the semi-rigid conduit is precisely metered.

20. An apparatus as claimed in claim 19, wherein the compression member defines a substantially flat surface.

21. An apparatus as claimed in claim 19, further comprising:
   a spare semi-rigid conduit, wherein a portion of the spare semi-rigid conduit is located between the compression member and the predetermined portion of the housing exterior surface, the semi-rigid fluid conduit and the spare semi-rigid conduit providing a balanced load on the compression member.

22. An apparatus as claimed in claim 19, wherein the second fluid supply device supplies gas to the fluid storage area.

23. An apparatus as claimed in claim 19, wherein the second fluid supply device supplies liquid to the fluid storage area.

24. An apparatus as claimed in claim 19, wherein the semi-rigid conduit is made of fluoropolymers.

* * * * *